Patented Apr. 1, 1952

2,591,024

UNITED STATES PATENT OFFICE 2,591,024

CARBON BLACK PELLETING PROCESS

Carl W. Sweitzer, Garden City, N. Y., assignor to Columbian Carbon Company, New York, N. Y., a corporation of Delaware No Drawing. Application September 16, 1950, Serial No. 185,335

4 Claims. (Cl. 23—314)

The present invention relates to carbon black beads or pellets, and more particularly to beads or pellets of carbon blacks of the class known as furnace blacks, as distinguished from so-called impingement or channel blacks. The invention provides an improved process whereby the difficulties previously experienced in the handling of furnace black pellets are avoided or materially reduced.

Essential characteristics of carbon blacks which render them particularly valuable in various industries are their extremely fine state of subdivision and their susceptibility to uniform dispersion in the media in which they are to be used, rubber, for instance.

Because of their extremely fine state of subdivision, and their light, bulky nature, carbon blacks are expensive to pack, ship and store, and the handling of the light powder causes it to fly into the air to such an extent that there is not only substantial loss of material, but great annoyance to workmen breathing the dusty air. There is also the possibility of contaminating other materials in the vicinity.

To avoid this difficulty, it has previously been proposed to form the finely divided black into small beads or pellets which may be subjected to ordinary handling without breakage or dusting, but which under conditions of use, for instance in the milling of rubber, are readily reconverted to the finely divided form susceptible to uniform dispersion in the rubber. A further advantage of carbon black in the bead form is its relatively free-flowing characteristic, provided the beads are of sufficient strength to resist crushing and excessive packing.

Various methods have been proposed for pelleting carbon blacks. One method which has been used with particular advantage, especially in the pelleting of channel or impingement carbon blacks, is that described in Reissue Patent 21,379, of March 5, 1940, granted on an application of H. J. Glaxner. In accordance with that disclosure, the carbon black is admixed with a limited amount of water to form a relatively heavy, doughy mass, and the mass progressively advanced through an elongated path while subjected to a multiplicity of impacts caused by agitation.

In view of the large amount of carbon black used in certain industries, notably the rubber industry, it is desirable to ship the carbon black in bulk in tank cars, and to handle the carbon black by conventional mechanical conveyors, gravity conveyors and the like. Such shipment and handling requires that the carbon black pellets be capable of withstanding very considerable pressure without material crushing or loss of their free-flowing characteristics.

Though little difficulty has been experienced in such handling of pellets of impingement carbon black, pellets formed from furnace blacks by conventional methods, without the use of added materials to act as binders, have generally been of insufficient strength to resist objectionable crushing, compression or matting together, with loss of their free-flowing characteristics, under such conditions. It has been generally recognized that pellets produced from furnace blacks by conventional methods have much lower resistance to such compression and matting together than pellets similarly produced from impingement or channel blacks.

The carbon blacks herein referred to as impingement or channel blacks are those which are made by burning a hydrocarbon in a zone to which there is supplied an amount of air insufficient for complete combustion of the hydrocarbon and causing the resultant flame to impinge upon a metallic surface upon which the black is deposited and from which it is collected. It is customary to use channel iron as the depositing surface, hence the name channel blacks.

As distinguished from impingement blacks, the blacks herein designated furnace blacks are made by burning a hydrocarbon in a chamber of a furnace with an amount of air insufficient for complete combustion, and separating the carbon black from the furnace effluent gases. This general classification of furnace blacks, as used herein, also includes blacks formed by thermally decomposing a hydrocarbon by admixing it with hot gases or passing it in contact with highly heated surfaces. The designation furnace blacks as used herein and in the accompanying claims is intended to include all blacks of the type produced by such furnace methods, not excluding the so-called lamp blacks.

I have discovered that the strength of furnace black pellets, that is their ability to withstand handling without objectionable crushing, compression or matting together, and to retain their free-flowing characteristics under pressure, is materially increased by subjecting the pellets in a static atmosphere to a high temperature usually not lower than about 1000° F., and permitting the pellets to cool to substantially atmospheric temperature while in a static atmosphere. The term "static atmosphere" is used herein to signify a condition where the atmosphere in contact with the carbon black being treated is in a substantially static, unrenewed condition, and is not blown across, or in contact with, the black as, for instance, in conventional activation operations.

It has previously been proposed to add various binders to the carbon black prior to or during the formation of pellets for the purpose of increasing their strength. However, such addition of binders has been generally unsatisfactory. In accordance with my present invention, the furnace black pellets are adequately strengthened without the addition of a binder or any adulterant. Accordingly, my present invention provides means of producing furnace black pellets of adequate strength and consisting of substantially pure carbon, excepting the small amount of occluded gases and acetone-extractable materials normally present in furnace carbons.

The furnace carbon blacks usually contain not less than 0.1 to 0.2% of acetone-extractable materials. Furnace blacks initially containing less than 0.1% of acetone-extractable materials are not amenable to my present process. The present invention is not generally applicable to the treatment of pellets of channel or impingement carbon blacks.

In accordance with the process of my present invention, the pellets are heated to a temperature sufficiently high to effect a melting, or softening, of the acetone-extractable material present therein, but below that at which the extractable material would be come coked, or otherwise substantially completely destroyed or driven off. Maximum advantages have usually been attained where the preformed furnace black pellets were heated by subjecting them in relatively small bodies to furnace temperatures within the range of 1200° to 1600° F. for a period of time just sufficient to heat the entire mass of pellets to a temperature at which the acetone-extractable material is melted, or softened. Advantageous results may be obtained by subjecting the pellets to a temperature of only about 1,000° F. At excessive temperatures there is a tendency toward coking the pellets, or some portion thereof, and, although the furnace black pellets may be somewhat strengthened by such treatment, the resulting harshness of the black due to coking is usually objectionable.

The optimum treating temperature will vary somewhat with the characteristics of the particular carbon black pellets treated and also with the manner in which the heating is effected. Carbon black pellets are notoriously poor conductors of heat and, accordingly, due care should be taken to avoid local overheating and coking. It does not appear to be necessary that the entire body of the black be heated to a uniform temperature in order to obtain a marked strengthening of the pellets, provided the entire body is heated to at least the temperature at which the acetone-extractable material is melted or softened. This minimum temperature appears to vary with different furnace blacks but is usually about 1000° F.

However, a rapid heating to the required temperature appears to be desirable, with the heating as uniformly as possible so as to minimize the temperature gradient in order that there may be retained in each of the pellets a substantial proportion of the acetone-extractable material initially present therein.

Advantageous results have been obtained by subjecting the pellets in relatively small crucibles of about 1½ inches in diameter to furnace temperatures within the range of about 1200° F. to about 1600° F. for about 15 minutes. At furnace temperatures around 1,000° F., a somewhat longer time factor may be required, especially where the black is heated in substantial bulk, without agitation. At still higher furnace temperatures, say 1800° F. to 2000° F., the time factor must be drastically shortened to prevent coking, and special precautions must be taken to prevent local overheating of the pellets with the resultant driving-off, or destroying, of all, or substantially all, of the acetone-extractable material initially present therein. Particularly, where such higher temperatures are used, it is generally desirable to stir, or tumble, the black during the heating period so as to obtain a more uniform heating of the pellets. Such higher furnace temperatures are usually not necessary and generally are not recommended.

I have observed that furnace black pellets initially high in acetone-extractable material, i. e., 1%, or more, appeared to lose this material more readily than those initially containing lower proportions thereof. This is perhaps due to a difference in the characteristics of the extractable material. In treating such pellets, high in extractable material, I have obtained excellent results by subjecting them to a temperature of 1200° F. to 1600° F. for a period of 1 or 2 minutes. Treating temperatures which would appear to be well above the decomposing temperature of acetone-extractable material which one would expect to find present in carbon black, have been used with advantage in some cases, due consideration being given to the time factor involved.

It has previously been proposed to activate impingement carbon black in pelleted form by treating the pellets with steam or air at a temperature of 1750° F. It has further been proposed to graphitize carbon black in pellet form by heating at a temperature of 3632° F. In both cases, the rubber compounding characteristics of the black are very materially changed. My present invention is distinguished from such operations by the fact that the rubber compounding characteristics of the carbon black of which the pellets are composed are not materially changed thereby.

As previously noted, an essential characteristic of my present process is that the heat treatment and cooling of the black are carried on in a static, unrenewed atmosphere. I prefer to use a closed vessel for heating the pellets, and, advantageously, one with a minimum of space not occupied by the pellets. The static atmosphere in contact with the black may be either oxidizing, neutral or reducing, but if it be an oxidizing atmosphere, some of the black may be burned.

Where steam, air, or other gaseous medium is passed in contact with highly heated pellets, the character of the carbon black is changed, volatile matter in the black being carried off, and further little or no strengthening of the pellets is attained. However, where the pellets are heated and cooled in a static atmosphere, in accordance with my present invention, there is no substantial loss or gain of the oxygen constituent of the black nor change in its fundamental rubber compounding characteristics.

The invention is generally applicable to the treatment of furnace black pellets, regardless of the particular method by which the pellets are formed.

The temperature and time of treatment are interdependent, as previously indicated, and as will appear from the following specific illustrations of my process. At a higher furnace temperature a shorter period of treatment will accomplish results comparable with those attained at a longer period of time at a lower furnace temperature, due consideration being given to the thickness of the body of furnace black pellets through which the heat must penetrate to bring the entire body to the required temperature. As soon as this condition has been attained, the carbon may be immediately cooled to atmospheric temperature or to some temperature higher than atmospheric at which danger of oxidation of the black, or loss of the residual acetone-extractable material, is avoided.

A treating temperature of about 1400° F. for a period of about 10 to 15 minutes has been found to give generally superior results, in small scale operations such as herein described. However, temperatures as low as 1000° F. and extending as high as 1600° F. have been used with marked advantage as previously noted. With due precaution to avoid coking and loss or destruction of all, or substantially all, of the acetone-extractable material, furnace temperatures as high as 2000° F. may be employed. At the lower end of the temperature range, periods of treatment extending as long as 90 minutes have been used with beneficial results. However, as previously noted, temperatures higher than 1600° F. are generally not recommended because of the danger of local overheating. The treatment of the carbon black pellets, particularly those containing 0.1 to 0.5% of acetone extractable at furnace temperatures of about 1200° F. to about 1600° F. for from 5 to 15 minutes has been found to give most satisfactory results.

A dependable guide for determining the optimum treating conditions under any specific set of circumstances is the compression characteristic of the resultant beads. A test which has been found to give reliable and consistent results may be carried out in an apparatus consisting of a ¾ inch i. d. glass tube about 6 inches long and two brass plungers having platform bases and adapted to slide into either end of the glass tube. In carrying out the test, the lower plunger is inserted in the tube, and with the tube in an upright position resting upon the base of the inserted plunger, a 5-gram sample of the furnace black beads to be tested is placed in the tube. The second plunger is then inserted into the upper end of the tube so as to rest upon the upper surface of the bead sample. The upper plunger is then weighted until a total weight of 25 kilograms is applied, this being equivalent to approximately 125 pounds per square inch. The reduction in height of the bead sample under this weight is determined by measurement of the original and final heights of the column of beads, and is expressed in percentage compressibility. The results of this test have been found to be a dependable index to the ability of carbon black beads to withstand tank car shipment and bulk handling without loss of their free-flowing characteristics. For satisfactory bulk handling, the compressibility of the beads should usually be less than 35%, and preferably should be about 25% to 30% where bulk handling of the beads is anticipated.

The effect of temperature and time on the increase in strength of the furnace black pellets is illustrated by the following specific examples of the application of my present process to furnace black pellets made by agitating a restricted amount of water with a furnace black having a surface area of about 6½ acres per pound in accordance with the Glaxner process. The results indicated in the following tabulation were obtained by heating the carbon black pellets in a closed crucible in an electric furnace, the temperature of the furnace in which the crucible was heated and time of treatment and the percentage compressibility and density of the resultant pellets are recorded in the following Table I, density being expressed in pounds per cubic foot. For comparative purposes the compressibility and density of the untreated pellets, Sample No. 1, are included.

*Table I*

| Sample No. | Treating Conditions | | Percent Compressibility | Density |
|---|---|---|---|---|
| | Furnace Temperature | Time in Furnace | | |
| | ° F. | Minutes | | |
| 1 | | | 34.5 | 33.6 |
| 2 | 1,000 | 10 | 33.6 | 33.8 |
| 3 | 1,000 | 31 | 32.2 | 33.8 |
| 4 | 1,000 | 90 | 31.6 | 33.7 |
| 5 | 1,200 | 15 | 29.4 | 33.9 |
| 6 | 1,400 | 15 | 22.0 | 34.0 |
| 7 | 1,600 | 15 | 21.0 | 33.6 |
| 8 | 1,400 | 5 | 29.1 | 34.2 |
| 9 | 1,400 | 10 | 23.2 | 34.2 |

From the foregoing examples it appears that the optimum results were attained where the temperature of the furnace was about 1400° F. to 1600° F. and the treating time from 10 to 15 minutes. Only slight benefit is attained with this particular furnace black at temperatures below 1200° F. even when the treating time is extended to 90 minutes.

The variation in results obtained by this treatment with various furnace blacks appear in Table II. Each sample was heated in a closed crucible in an electric furnace at a furnace temperature of 1400° F. for a period of 15 minutes. In each instance, percentage compressibility and density of the pellets prior to heating and subsequent to heating in accordance with the present invention are given for comparison, under the respective headings "control" and "heated."

*Table II*

| Sample No. | Percent Compressibility | | Density | |
|---|---|---|---|---|
| | Control | Heated | Control | Heated |
| 10 | 32.2 | 21.5 | 32.8 | 33.4 |
| 11 | 34.4 | 28.8 | 31.4 | 31.5 |
| 12 | 43.1 | 32.1 | 35.6 | 36.4 |
| 13 | 33.9 | 11.2 | 22.2 | 22.1 |
| 14 | 48.6 | 38.2 | 26.6 | 26.2 |

The pellets of Samples 10 and 11 were composed of fine furnace black similar to that of the samples of Table I. Sample 12 was a coarser furnace black such as that marketed under the trade name "Furnex." The pellets of Samples 13 and 14 were composed of lamp black.

While it appears to be desirable to avoid all loss of the acetone-extractable material initially present in the black, some loss seems to be inevitable under practical operating conditions because of the difficulties involved in obtaining uniform heating. Such losses may be due in part to vaporization and perhaps also to some partial decomposition or reforming of the acetone-extractable material. However, the proportion of initial acetone-extractable material retained in the black does not appear to be particularly critical so long as the residual acetone-extractable is a substantial proportion of that initially present. Losses of initial acetone-extractable material as high as 50% to 75% are generally permissible. Even higher losses may in some cases be tolerated so long as the residual acetone extractable is adequate to effect the required strengthening of the pellets.

The rubber-compounding characteristic of the black of which the pellets are composed is substantially unaltered by treatment in accordance with my improved process, and there is usually little change in the density of the pellets.

Further, though the treatment of furnace black pellets in accordance with my present invention results in a substantial increase in the strength of the pellets, the resultant pellets are readily disintegrated in conventional mixing and milling operations in which the black is used, and the dispersibility of the black is not materially affected.

The present application is in part a continuation of my copending application Serial No. 692,597, filed July 10th, 1946, now abandoned.

I claim:

1. A process for increasing the strength of furnace black pellets which comprises heating the preformed pellets containing not less than 0.1% of acetone-extractable material in a static, unrenewed atmosphere to a temperature above the softening point of the acetone-extractable material but below that where substantial coking is effected and below that where the rubber compounding characteristics of the black are substantially altered, discontinuing the heating at a point where a substantial proportion of the acetone-extractable material initially present in the black remains therein and immediately thereafter cooling the pellets in a static atmosphere to a temperature below that where oxidation of the black results and below that where substantial loss in acetone-extractable material would result, so as to retain in the black a substantial proportion of acetone-extractable material initially present therein.

2. The process of claim 1 in which the black is heated by subjecting it to a temperature within the range of 1000° to 2000° F.

3. The process of claim 1 in which the black is heated by subjecting it to a temperature within the range of 1200° to 1600° F.

4. The process of claim 1 in which the black is heated to a temperature of at least 1000° F.

CARL W. SWEITZER.

REFERENCES CITED

The following references are of record in the file of this patent:

UNITED STATES PATENTS

| Number | Name | Date |
|---|---|---|
| Re. 18,884 | Wiegand | June 27, 1933 |
| 2,134,950 | Offutt | Nov. 1, 1938 |
| 2,317,026 | Brown | Apr. 20, 1943 |
| 2,518,211 | Wiegand et al. | Aug. 8, 1950 |

FOREIGN PATENTS

| Number | Country | Date |
|---|---|---|
| 118,922 | Australia | Sept. 5, 1944 |

OTHER REFERENCES

Industrial and Engineering Chemistry, vol. 20, No. 9, September 1928, pages 904-908 vol. 21, No. 10, October 1929, pages 911-914.

The Rubber Age, August 1944, pages 469-478.